United States Patent [19]
Pieper

[11] Patent Number: 5,600,669
[45] Date of Patent: Feb. 4, 1997

[54] ELECTRODE ASSEMBLY FOR GLASS TANK FURNACES

[75] Inventor: Helmut Pieper, Lohr am Main, Germany

[73] Assignee: Beteiligungen Sorg GmbH & Co. KG, Lohr am Main, Germany

[21] Appl. No.: 570,136

[22] Filed: Dec. 11, 1995

[30] Foreign Application Priority Data

Dec. 17, 1994 [DE] Germany .......................... 44 45 167.9

[51] Int. Cl.⁶ .................................................. C03B 5/027
[52] U.S. Cl. ................................ 373/38; 373/37; 373/100
[58] Field of Search .............................. 373/27, 36, 37, 373/38, 100

[56] References Cited

U.S. PATENT DOCUMENTS

| | | | |
|---|---|---|---|
| 3,417,187 | 12/1968 | Blumenfeld et al. | 373/37 |
| 3,777,040 | 12/1973 | Gell et al. | 373/38 |
| 4,468,779 | 8/1984 | Gillman | 373/36 |
| 4,897,853 | 1/1990 | Argent | 373/36 |
| 5,125,002 | 6/1992 | Steitz | 373/37 |
| 5,151,918 | 9/1992 | Argent et al. | 373/27 |

FOREIGN PATENT DOCUMENTS

| | | |
|---|---|---|
| 1015989 | 9/1957 | Germany. |
| 2425025 | 12/1975 | Germany. |
| 2621380 | 11/1976 | Germany. |
| 2918643 | 11/1980 | Germany. |
| 3815558 | 11/1989 | Germany. |

*Primary Examiner*—Tu Hoang
*Attorney, Agent, or Firm*—Hill, Steadman & Simpson

[57] ABSTRACT

An electrode assembly for glass tank furnaces comprises a rod electrode inserted in a cylindrical electrode holder, through which it can be advanced. Along at least part of its length the said electrode holder is fitted with a device for forced cooling and is installed in an electrode block in the furnace. In order to dispense with and in order to operate the electrode holder at a constant temperature the holder is inserted with the bottom face below a filling level determined by the design of the furnace, and provided with a seal between it and the electrode above the filling level. Preferably the electrode holder has an outer tube and an inner tube, which create an annular gap between them for a cooling medium, whereby the inner tube protrudes out of the upper end of the outer tube and a sealing unit is provided between the inner tube and the electrode.

13 Claims, 1 Drawing Sheet

5,600,669

ELECTRODE ASSEMBLY FOR GLASS TANK FURNACES

BACKGROUND OF THE INVENTION

The invention concerns an electrode assembly for glass tank furnaces with a rod-shaped electrode, inserted in a cylindrical electrode holder, through which it can be advanced, the electrode holder being provided with a device for forced cooling along at least part of its length, whereby the holder is installed in an electrode block with the face of the holder installed below a level determined by the design of the furnace and whereby a seal is provided between the electrode holder and the electrode outside the furnace.

It is known that rod-shaped electrodes, which are normally made of molybdenum, high alloy steels or inconel, can be inserted into the glass melt either through the furnace superstructure, crown, sidewalls or bottom to provide direct heating of the glass melt by means of the Joule effect as a result of the current passage through the glass melt. In the majority of cases the electrode material is molybdenum.

In the furnace atmosphere, which contains a substantial proportion of Oxygen, temperatures of up to approximately 1600° C. occur, depending on the glass composition. At such temperatures most electrode metals tend to oxidize significantly which soon leads to their destruction. Molybdenum in particular oxidizes to an appreciable extent at temperatures above approximately 550° C.

The part of the electrodes immersed in the glass melt does not suffer the same level of oxidization, as the glass melt itself exercises a certain degree of protection against oxidization. Therefore the oxidization problem is only present here to a minor degree.

Patents DE-B-24 25 025 and U.S. Pat. No. 5,125,002 teach that, in the case of electrodes which are inserted into the melt through the bottom of the furnace, the part of the electrode which is outside of the melt must be surrounded by a cooling jacket and that an annular gap must be left between the electrode and its surrounding electrode block, so that the glass can penetrate into this gap where it solidifies in order to produce a sealing effect. In order to advance the electrode the glass surrounding the electrode must be melted by reducing the cooling. However, this results in a temperature increase on the part of the electrode which does not come into contact with the glass which once again increases the risk of oxidization. In order to reduce this risk, it is suggested in the two above-mentioned patents that a seal is provided at the end of the cooling unit opposite the glass melt, and that the intermediate space between the cooling unit and the electrode is filled with an inert gas under pressure. However, the continuous supply of inert gas is a complicated process especially as glass tank furnaces normally have a number of such electrodes. Furthermore, the continual temperature changes which are necessary to solidify the glass on the one hand and to melt it on the other, result in significant thermal loading of the furnace bottom and the electrode holder. However, large temperature changes should always be avoided in glass tank furnaces.

Similar electrode assemblies have also been produced for the sidewalls of glass furnaces. Such assemblies are described in DE-AS 10 15 989 and in DE-OS0-29 18 643. In both installations glass is also used as a sealing material and must be melted before the electrodes can be advanced.

However, the assemblies described above can only be heated to temperatures of approximately 1000° to 1050° C. as above these temperatures the stability of the holder is reduced so much that the holder is destroyed when the electrode is advanced. However, there are glasses which have softening points above the temperatures mentioned, so that in such cases the cooling of the holder cannot be interrupted.

DE 26 21 380 A1 describes an electrode assembly with a system of rods arranged radially, whereby the rods are referred to as primary electrodes, in which the parts of the rods which penetrate the surface of the melt are provided with cooling jackets, which do not serve as holders, in order to prevent damage caused by oxygen from the atmosphere. However, no provision is made for adjusting the rods within the cooling jackets and the cooling jackets are not sealed against the rods. The actual electrode holders are situated above the surface of the melt.

DE 38 15 558 A1 describes an electrode holder of similar type, which is inserted horizontally in the furnace wall. As a result of the unavoidable gap between electrode and holder and with liquid glass it is inevitable that glass entering the gap will displace the air up to the non-adjustable seal and will solidify in the cooled area, whereby the cooling effect decreases from the inside to the outside. The advancing of the electrode is adversely affected. The point at which the solidification starts depends on the cooling intensity. In any event, glass under hydrostatic pressure serves as a sealing medium.

SUMMARY OF THE INVENTION

The aim of the present invention is therefore to produce an electrode assembly of the type described initially in which glass is no longer required as a sealing medium and in which a relatively long gap is maintained in the region of the colder part of the electrode free of glass and oxygen and not subject to the hydrostatic pressure from the melt so that the cooling intensity is no longer critical for the advancing of the electrode.

The object of the invention is achieved with the electrode assembly described initially in that the axis of the electrode holder and the electrode is set at an angle between 0° and 60° to the vertical. The apparatus for forced cooling extends above the filling level and the electrode holder is provided, with a sealing unit, above this filling level which seals the gap between the holder and the electrode, and which prevents oxygen from penetrating into this gap.

The essential element of the invention therefore consists of introducing the electrode into the melt from above or angled from above and immersing the lower end of the electrode holder in the glass melt and/or in a gall layer which floats on the melt, whereby the immersion is minimized, while providing a seal of the annular gap between the electrode and the electrode holder above the filling level, whereby the gap is kept as small as possible. According to the invention, the part of the electrode which extends into the furnace chamber is protected by the glass from the effects of oxygen, and the gas contained in the annular gap cannot be displaced by any glass penetration into the gap, which would then freeze and impede the electrode. The sealing above the filling level of the melt means that no oxygen can enter the annular gap between the electrode and electrode holder from this side. Furthermore, this section of the electrode is strongly cooled by the forced cooling of the electrode holder, so that the tendency to oxidize is greatly suppressed.

As a result of the combined effect of the measures described, the part of the electrode not protected by the glass melt is maintained at a constant low temperature level and is also protected against the effect of oxygen. According to the invention, the electrode axis may be vertical, while an angle between 10° and 60° to vertical is advantageous, and an angle between 20° and 40° to vertical is preferred. In particular, it is not necessary to introduce pressurized inert gas into the annular gap between the electrode and the electrode holder, as the electrode construction in accordance with the invention ensures sufficient sealing.

As a result of the fact that the electrodes are not sealed, as opposed to the state-of-the-art, i.e., as there is no longer any glass between the electrode holder and the electrode, it is possible to advance the electrodes at significantly lower holder temperatures, so that the electrode holder also has a longer life.

In a further embodiment of the invention, it is particularly advantageous if the electrode holder has an outer and an inner tube, whereby a cooling medium can be applied in the annular gap between the two tubes and if the top of the inner tube protrudes out of the outer tube, and the inner tube is fitted with a sealing unit to seal against the electrode. This sealing unit can be in the form of an adjustable gland seal.

A particularly easy method of fixing the electrode holder in the electrode block involves the use of an insulation sheath as an intermediate layer, made of a material which is not electrically conductive even at high temperatures.

In a further embodiment of the invention, it is particularly advantageous if the lower face of the electrode holder is at approximately the same level as the lower face of the electrode block. This avoids the formation of an annular gap into which solidifying glass could penetrate between the electrode and the electrode block, while no part of the cooled electrode holder extends into the melt, where glass could solidify and where it would be exposed to direct attack from the hot melt.

In order to ease installation and removal of the electrode assembly it is advantageous if, where a crown is used to cover the furnace, the electrode block is installed in a joint between the top of the tank and the crown with openings being provided in the crown for an electrode block for each electrode assembly.

As the opening in the crown has a recess into which the electrode block can be swung, the installation and removal of the complete electrode assembly is considerably simplified.

The electrode assembly according to the invention is particularly suitable for melting furnaces for the vitrification of waste materials such as asbestos, radioactive waste, filter dust from incineration plants, etc., which are harmful to the environment.

BRIEF DESCRIPTION OF THE DRAWINGS

An example of the subject of the invention is described in detail with the aid of the only figure, which shows a cross section through the electrode and the electrode holder, the electrode block, the furnace, the crown and the gland seal.

DETAILED DESCRIPTION OF THE PREFERRED EMBODIMENTS

Figure 1:
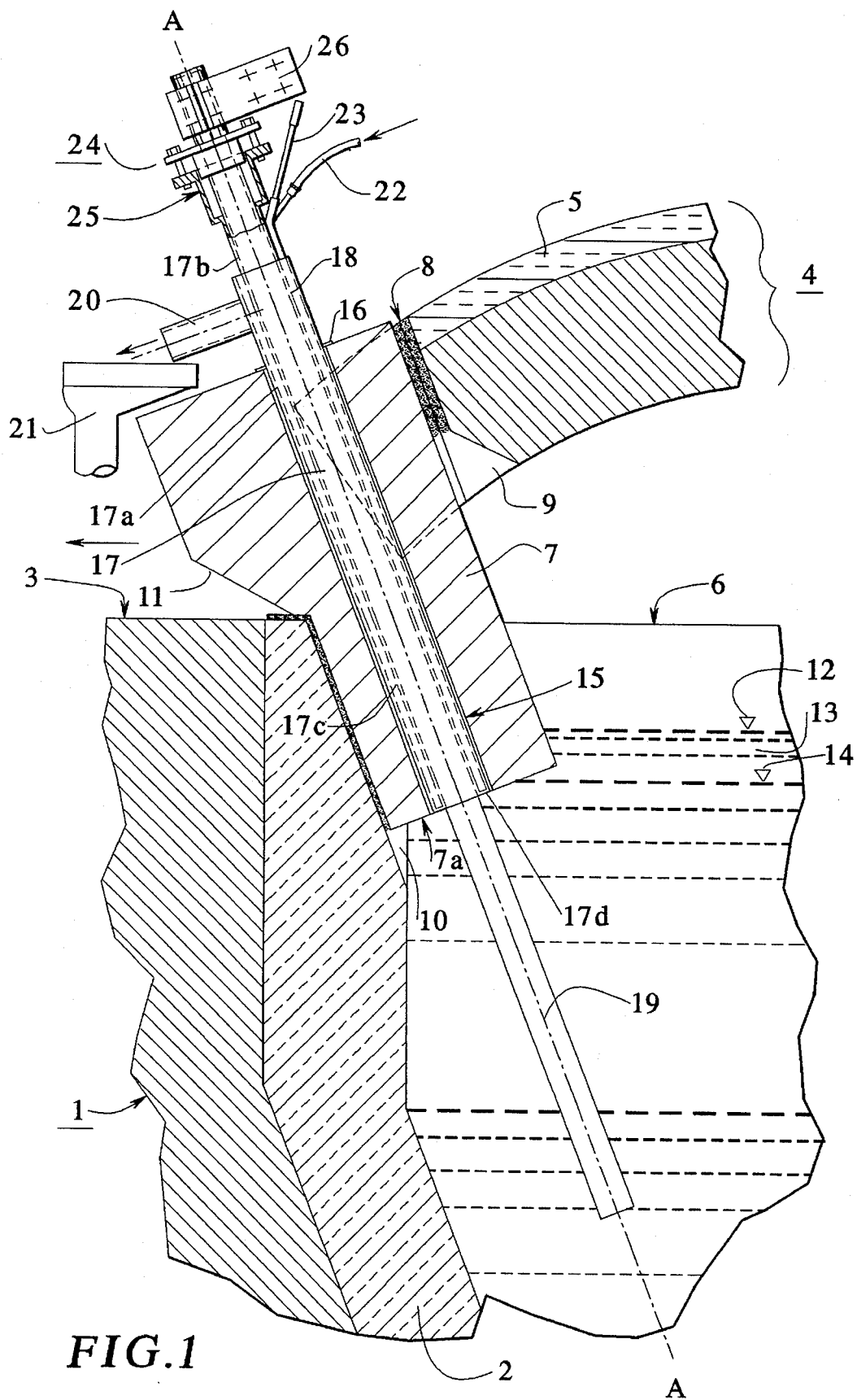

FIG. 1 shows a tank 1 of a glass melting furnace, the inner side of which is made of a ramming mix 2. The tank 1 has a top surface 3 around the circumference, upon which the crown 4 is supported, to which an insulating layer 5 belongs. A joint 6 is formed between the top surface 3 and the crown 4, in which an electrode block 7 is installed. Provision is made in the crown 4 for the electrode block 7 in the form of an opening 8 of the appropriate shape. This opening 8 is extended on the inside of the crown by an extension 9, which is shaped so that the electrode block 7 can move partially into the extension 9 by a counter-clockwise radial movement.

The ramming mix 2 also has an opening 10 in the area of the joint 6 and the electrode block 7 extends partly into this opening. The electrode block 7 has a horn° shaped projection 11, which is supported on the upper surface 3. An intermediate sealing layer of mineral fiber is indicated in the figure, but not detailed.

The tank 1 is designed for an initial filling level 12, and equipment is provided to ensure that this filling level 12 is always maintained during operation.

In case a so-called gall layer 13 is formed during melting, which may occur in particular when waste materials are melted, a second filling level 14 is defined which specifies the maximum thickness of the gall layer, and the level of the melt in the tank should never be lower than this filling level.

The electrode block 7 has a cylindrical longitudinal hole 15, in which an insulating sleeve 16 with a constant wall thickness is installed, at the top end of which there is a ring flange, which is not detailed. A cylindrical electrode holder 17 is installed inside the cylindrical hole of the insulating material sleeve 16 with the smallest possible tolerance between the two. An apparatus 18, for forced cooling, is provided along the majority of the length of the electrode holder 17. This apparatus 18 is formed by an annular gap 17c between the outer tube 17a and the inner tube 17b of the electrode holder, through which a cooling medium can be passed.

A rod electrode 19, which in this case is made of molybdenum, is installed inside the inner tube 17b, once again with the smallest possible tolerance. A large proportion of this electrode protrudes out of the lower end 17d of the electrode holder 17, whereby the lower end is situated at the same level as the lower face 7a of the electrode block 7. As already mentioned, this prevents the formation of a ring-shaped opening between the electrode 19 and the electrode block 7. Furthermore, this ensures that the cooled electrode holder 17 does not protrude into the glass melt, so that an unacceptable quantity of frozen glass cannot be formed. It can be seen in the figure that the extremely narrow annular gap between the electrode holder 17 and the electrode 19 is covered by the glass melt and, in particular, that the complete free length of the electrode 19 lies below the filling level 12. It is therefore impossible for the free surface of the electrode 19 to come into contact with oxygen.

The outer tube 17a protrudes out of the electrode block 7, or more precisely out of the insulating sleeve 16, to a certain extent, and an outlet tube 20, through which the cooling medium, usually water, can be drained into a collecting funnel 21, is attached to the side of this part of the outer tube 17a. The cooling medium is supplied to the annular gap 17c by means of a cooling medium inlet pipe 22. Also shown is the outside end of a temperature sensor 23, which is used to measure the temperature of the electrode holder 17 at the critical location, i.e., in the region of the lower end 17d.

The inside tube 17b of the electrode holder 17 protrudes out of the upper end of the outer tube 17a, whereby the upper end of the inside tube is fitted with a sealing device 24, in the form of an adjustable gland seal 25, which seals against the electrode 19. This is an effective method of preventing oxygen from the atmosphere surrounding the electrode holder 17 from entering the inner tube 17b. As the electrode 19 is subject to very low temperatures in this area, as a result of the electrode holder cooling, this part of the electrode 19 is also effectively protected against oxidization. An electrical connection 26, the purpose of which is self-evident, is attached to the topmost end of the electrode 19.

The electrode holder 17 and the electrode 19 have a common axis A-A, which is at an angle of 25° from vertical. In order to facilitate removal of the complete electrode assembly, the assembly is rotated along another axis which is perpendicular to the plane of the drawing, whereby the lower part of the electrode block 7 is swung counter-clockwise into the opening 9 in the crown 4. In this position the complete electrode assembly can be withdrawn easily from the furnace, maintained and replaced, if necessary.

Tests using the subject of the invention for the vitrification of so-called fly-ash from incinerators have shown that it is not difficult to advance the rod electrode in the electrode holder in or out along axis A—A, and, in particular, it is not necessary to reduce the cooling during advancing, and, therefore, an increase in the temperature of the electrode and electrode holder in the area where the electrode is no longer immersed in the melt does not occur. Furthermore, it has been shown that as a result of the use of the sealing device 24, at the upper end of the electrode, the infiltration of oxygen is prevented. The low temperatures in this area mean that the sealing effect is maintained over a very long period. Surface oxidization of the part of the electrode not covered by the glass melt could not be observed.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An electrode assembly for a glass melting furnace having a filling level and an electrode block, the electrode assembly comprising: a cylindrical electrode holder with a rod electrode extending through said electrode holder, the rod electrode able to be selectively advanced through the cylindrical electrode holder while said electrode is operating, said electrode holder having a bottom face and a device for forced cooling fitted along at least part of its length, said electrode holder being disposed in the electrode block in the furnace, said bottom face being disposed below the filling level of the furnace, an axis of said electrode holder and said electrode being at an angle of between 0° and 60° from vertical, said device for forced cooling extending above said filling level and said electrode holder being fitted with a sealing device above said filling level which seals against said electrode and which prevents oxygen penetrating into a gap between said electrode and said electrode holder.

2. An electrode assembly according to claim 1, wherein the axis of said electrode holder and said electrode is at an angle of between 20° to 40° from vertical.

3. An electrode assembly according to claim 1, wherein said electrode holder has an outer tube and an inner tube, which enclose an annular gap for a cooling medium, and wherein a top end of said inner tube protrudes out of said outer tube and wherein said sealing device is in the form of an adjustable gland seal.

4. An electrode assembly according to claim 1, wherein said electrode holder is installed in said electrode block with the aid of an insulating sleeve.

5. An electrode assembly according to claim 1, wherein said bottom face of said electrode holder is flush with a bottom face of said electrode block.

6. An electrode assembly according to claim 1, wherein said opening in said crown has a recess into which said electrode block can be rotated.

7. An electrode assembly for use in a glass melting furnace having a glass filling level, the electrode assembly comprising:

an electrode holder having a cylindrical passage and a bottom face, the bottom face being disposed below the glass filling level;

a rod electrode, which is selectively advanced through a top end of said cylindrical passage in said electrode holder, while said electrode is operating, to extend beyond said bottom face;

means for forced cooling of a portion of said electrode positioned within said electrode holder, said means extending along at least part of a length of said electrode; and a seal between said electrode and said electrode holder at said top end which prevents oxygen from penetrating into a gap between said electrode and said top end of said electrode holder.

8. An electrode assembly according to claim 7, wherein said electrode holder has an outer tube and an inner tube, which enclose an annular gap for a cooling medium, and wherein a top end of said inner tube protrudes out of said outer tube and wherein said seal is in the form of an adjustable gland seal positioned at said top end of said inner tube.

9. An electrode assembly according to claim 7, further including an electrode block having a cylindrical passage therein for receiving said electrode holder therethrough.

10. An electrode assembly according to claim 9, including an insulating sleeve positioned between said electrode holder and said electrode block.

11. An electrode assembly according to claim 9, wherein said bottom face of said electrode holder is approximately flush with a bottom face of said electrode block.

12. An electrode assembly according to claim 7, wherein said means for forced cooling comprises a passage within said electrode holder for receiving a flow of a cooling fluid.

13. An electrode assembly according to claim 7, wherein said seal comprises an adjustable gland seal.

* * * * *